United States Patent
Burt et al.

(10) Patent No.: US 6,527,059 B1
(45) Date of Patent: Mar. 4, 2003

(54) LOOSENED SOIL RELATIVE TO SWEEPS FOR ENERGY REDUCTION ON CHISEL PLOWS

(75) Inventors: Eddie C. Burt, Auburn, AL (US); Clarence E. Johnson, Auburn, AL (US); John E. Morrison, Jr., Salado, TX (US)

(73) Assignees: The United States of America as represented by the Secretary of Agriculture, Washington, DC (US); Auburn University, Auburn University, AL (US)

( * ) Notice: Subject to any disclaimer, the term of this patent is extended or adjusted under 35 U.S.C. 154(b) by 0 days.

(21) Appl. No.: 09/505,049

(22) Filed: Feb. 16, 2000

(51) Int. Cl.[7] ............................................... A01B 39/20
(52) U.S. Cl. ....................................... 172/193; 172/722
(58) Field of Search ................. 172/138, 141, 172/142, 144, 166, 178, 63, 397, 398, 489, 149, 719, 722, 724, 742, 730, 193, 194, 195, 196

(56) References Cited

U.S. PATENT DOCUMENTS

| | | | | | |
|---|---|---|---|---|---|
| 3,556,227 | A | * | 1/1971 | Homdrom et al. | 172/193 |
| 4,250,970 | A | | 2/1981 | Pfenninger et al. | 172/138 |
| 4,538,689 | A | * | 9/1985 | Dietrich, Sr. | 172/700 |
| 4,625,809 | A | * | 12/1986 | Moynihan | 172/178 |
| 5,520,125 | A | * | 5/1996 | Thompson et al. | 111/120 |
| 5,649,601 | A | | 7/1997 | Nash | 111/120 |

* cited by examiner

*Primary Examiner*—Robert E. Pezzuto
(74) *Attorney, Agent, or Firm*—M. Howard Silverstein; Randall E. Deck; John D. Fado

(57) ABSTRACT

The apparatus for tilling soil provides a significant reduction in energy consumption. The apparatus includes one or more sweeps which are effective for subtilling the soil as it is moved therethrough. One or more tillers are provided ahead of the sweeps, sufficiently near the path of travel of the outermost ends or tips of the sweep blades so as to disturb or loosen the soil directly in the path of the ends of the blades. By positioning the tillers relative to the sweep tips in this manner, energy consumption may be significantly reduced in comparison to subtilling devices having coulters or other tillers positioned ahead of the center of the sweeps.

29 Claims, 10 Drawing Sheets

LOOSENED SOIL RELATIVE TO SWEEPS FOR ENERGY REDUCTION ON CHISEL PLOWS

BACKGROUND OF THE INVENTION

1. Field of the Invention

This invention relates to a novel method and apparatus for tilling soil.

2. Description of the Prior Art

Conservation farming systems, including no-till and reduced till methods and apparatus, are well known soil conservation farming expedients and are rapidly increasing in popularity.

One of the common tools of no-till or reduced till farming is the sweep blade. Typical sweeps are V-shaped with a pair of rearwardly diverging blades or wings, and are passed through the soil about two to four inches below the surface to undercut standing residue and kill weeds. Sweeps also have been used to incorporate fertilizers and pesticides into the soil. Chisel-sweep systems, wherein sweeps have been incorporated onto a chisel plow shank, have an advantage over many conservation tillage tools because they maximize the residue left on the surface for erosion control while providing tillage necessary for weed control and seedbed preparation.

With chisel-sweep systems however, the accumulation of residue within the confines of the tillage tool is a common problem. The proper vertical clearance between the soil surface and the supporting framework of the tillage device is necessary for the passage of residue. Furthermore, the proper lateral clearance between chisels is often a compromise between proper tillage action and passage of the residue. To enhance the passage of residue in such systems, coulters have been positioned ahead of the sweeps or chisel points to cut a path for the tool shanks. These coulters are typically placed ahead of the center or apex of the sweep, operating at depth slightly less than the sweep.

SUMMARY OF THE INVENTION

We have now invented a novel apparatus for tilling soil with a significant reduction in energy consumption. The apparatus includes one or more sweeps which are effective for subtilling the soil as it is moved therethrough. One or more tillers are provided ahead of the sweeps, sufficiently near the path of travel of the outermost ends or tips of the sweep blades so as to disturb or loosen the soil which is directly in the path of the ends of the blades, and substantially at or above the depth of the blade's ends. Selected tillers which may be used include coulters, rippers, knives, chisel plow shanks, and cultivator shovels. By positioning the tillers relative to the sweep tips in this manner, energy consumption may be significantly reduced in comparison to subtilling devices having coulters or other tillers positioned ahead of the center of the sweeps.

In accordance with this discovery, it is an object of this invention to provide an improved method and apparatus for tilling soil with reduced energy consumption.

It is also an object of this invention to provide a method and apparatus for conservation tillage of soil with reduced energy consumption.

Other objects and advantages of the invention will become readily apparent from the ensuing disclosure.

DETAILED DESCRIPTION OF THE INVENTION

Figure 1:
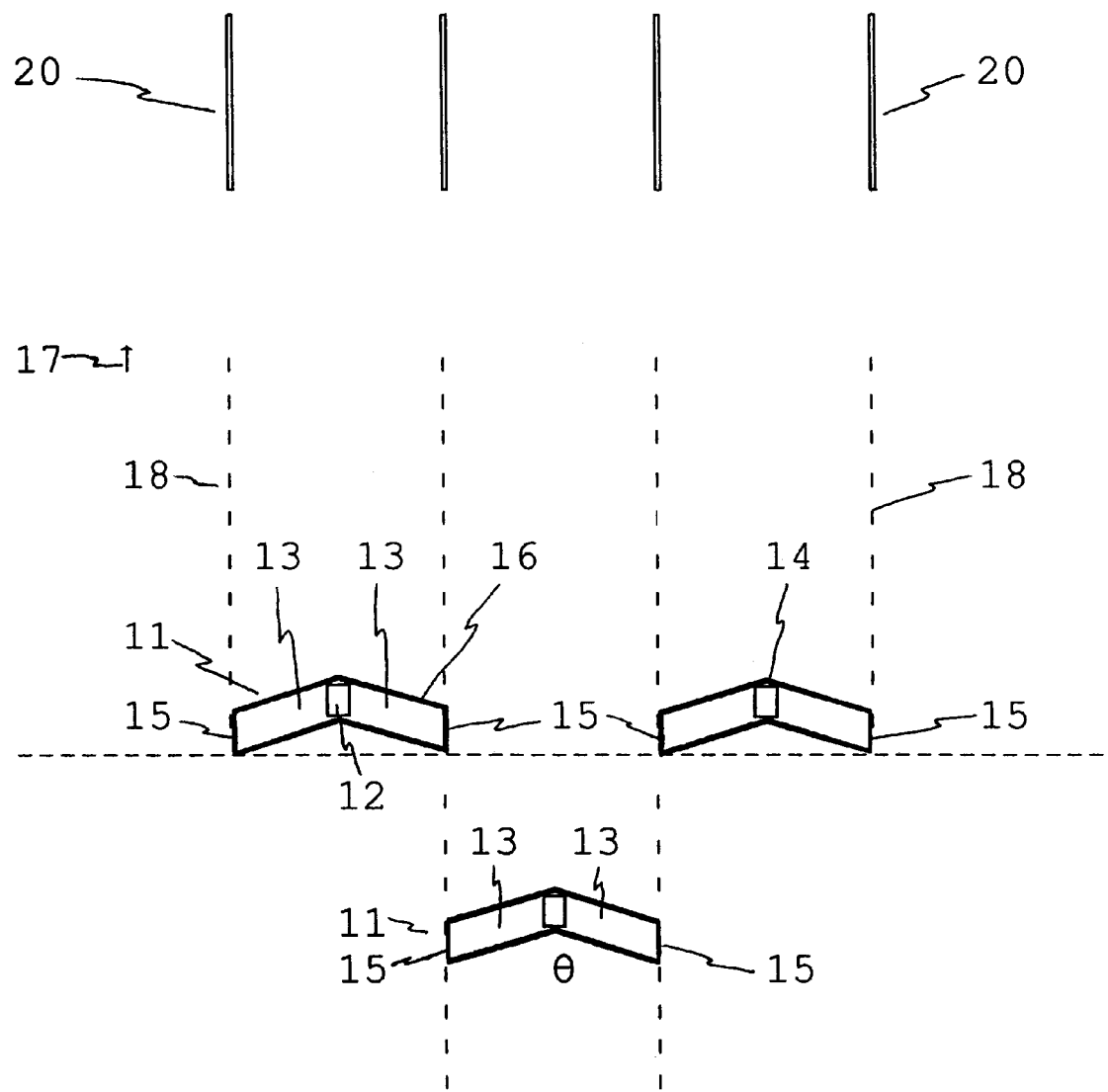
FIG. 1 is a top view of one embodiment of the tilling apparatus of the present invention with coulters positioned in front of the wing tips of the chisel sweeps.
Figure 2:
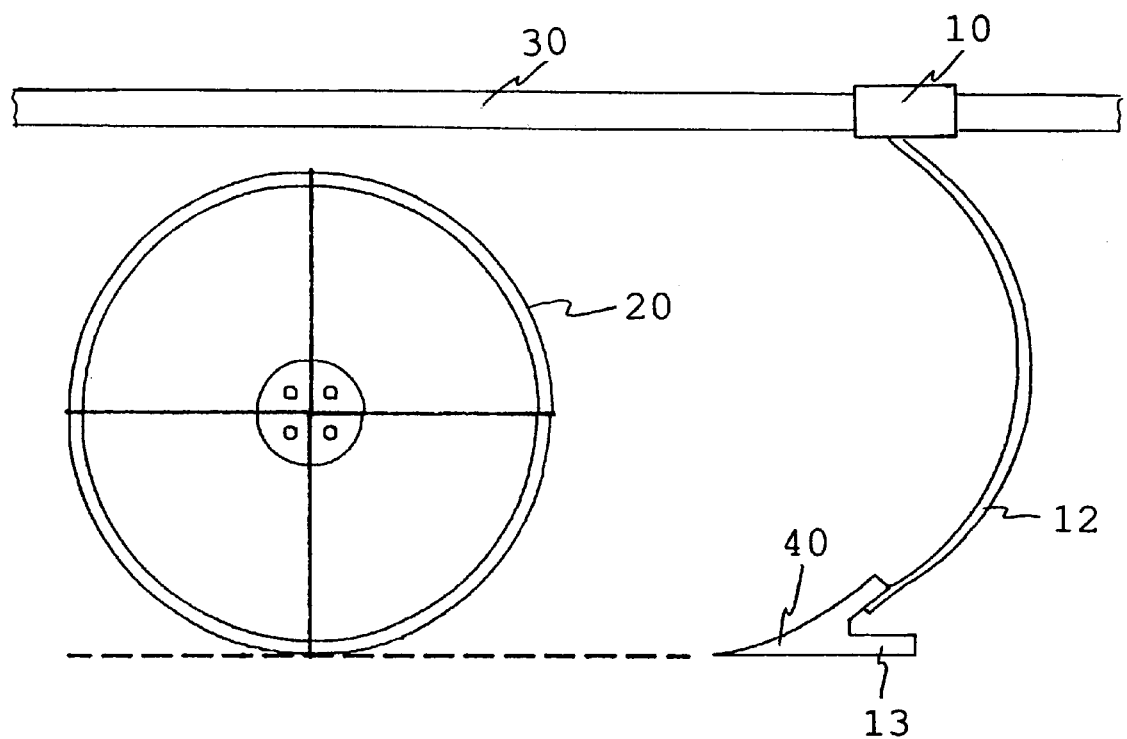
FIG. 2 is a side view of the device of FIG. 1.

Referring now to FIGS. 1 and 2, the tilling apparatus includes at least one sweep 11 connected to a downwardly extending support member or chisel shank 12 for attachment to a tool bar or frame 10 which may in turn be connected to a tractor or other vehicle. Sweeps 11 are constructed with a pair of diverging blades or wings 13 which extend rearwardly and outwardly from juncture or apex 14 and terminate at tips or ends 15. The forward or leading edges 16 of the blades 13 till the soil, undercutting standing residue and killing weeds, as the sweep moves below the soil surface.

The size and shape of the sweeps are not critical, and a variety of sweeps are suitable for use herein. The sweeps are generally "V-shaped", although the blades 12 may be symmetric (as shown) or asymmetric. Moreover, the sweeps utilized in the device may be "soil lifting", wherein the blades are tilted with their rear edges elevated above the leading edge, or the sweeps may include blades which are substantially flat and coplanar. In the preferred embodiment, the sweeps are constructed with soil lifting blades which are approximately equal in size and which are substantially symmetrically disposed, with the line bisecting the internal angle θ between the rear edges of blades 13 being parallel to the path of travel of the sweep through the soil which is indicated by the arrow 17 in FIG. 1 (i.e., the vertex of the forward edges of the sweep is directed along the path of travel). Without being limited thereto, examples of sweeps that are suitable for use herein are described by Nash (U.S. Pat. No. 5,649,601) and Mielke et al. (U.S. Pat. No. 4,817,727), the contents of each of which are incorporated by reference herein.

One or more soil coulters or other tillers 20 are positioned ahead or upstream of the sweeps 11, depending from the same or an additional tool bar or frame. In accordance with this invention, the position of the tillers relative to the sweeps, particularly to the outer ends 15 of the sweeps, is critical. We have unexpectedly discovered that by placing a tiller forward of at least one, and preferably both, of the ends 15 of the sweep blades at a position effective to disturb or loosen the soil in a vertical plane which contains the line of the projected path of travel of the ends 15 (these projected paths are shown as dashed lines 18), the energy required for the tillage operation is significantly reduced in comparison to devices wherein the tillers are positioned in the path of travel of the center or apex 14 of the sweep. As will be discussed in greater detail hereinbelow, the depth of the soil disruption (i.e., within the plane containing the line of the projected path of travel of the ends 15) is somewhat variable.

Without wishing to be bound by theory, in conventional sweep systems, as the sweep is moved through the soil, the soil is compressed in the region near the sweep ends 15. By providing tillers 20 ahead of the sweep ends 15 in accordance with this invention, soil in the vicinity of the sweep ends is loosened in advance; as the sweep travels through the soil, the soil at the sweep ends 15 may then move into this loosened soil, relieving the stress or compression in the soil which is normally generated at the sweep ends.

Using tillers positioned relative to the sweep ends in this manner, we have achieved a reduction in draft energy requirements up to 45%. A variety of soil tillers are suitable for use herein, and include but are not limited to coulters, rippers, knives, chisel plow shanks, and cultivator shovels, with coulters being particularly preferred.

Selection of the lateral spacing of the tillers 20 relative to the path of travel 18 of the sweep ends 15 is essential, and this spacing must be sufficiently small to effect disruption or loosening of the soil ahead of the sweep ends (i.e., in their path of travel). The optimal lateral spacing of the tillers 20 relative to the path of travel of the sweep ends 15 may vary with the particular tiller selected, the sizes of the tiller and the sweep, and the soil type and conditions, and may be determined by the skilled practitioner. Surprisingly, the energy reduction is much greater when the tillers 20 are positioned substantially in line with or outside of the paths of travel 18 of the sweep ends 15. In contrast, placement of the tillers 20 inside of the path of travel of the sweep ends (i.e., between the paths of travel of the apex 14 and ends 15) results in a substantial reduction in the energy savings. Without being limited thereto, the lateral spacing of the inside edge of the tillers 20 (the side closet to the sweep) from the path of travel 18 of the sweep ends 15 is preferably between about 0 to 2 inches, particularly between about 0 to 1 inches, and optimally between about 0.5 to 1 inches.

Potential savings in energy are also impacted by the relative depths of the tillers 20 to the sweep ends 15. The tillers 20 should extend to a depth which is effective to loosen the soil which is ahead of and substantially at or above the depth of the sweep ends 15. Generally, the depth of the tillers 20 may be as little as about 50% of the depth of the sweep ends 15 and still achieve a reduction in energy requirements. However, in the preferred embodiment, the tillers will extend to a soil depth which is approximately at the depth of operation of the sweep ends for optimal energy reduction. Operation of the tillers at depths substantially below the sweep ends is not necessary and may even reduce the overall energy savings. The spacing of the tillers 20 fore of the sweep ends 15 is not critical, and need only be sufficient to enable the tillers to contact and loosen the soil before it is contacted by the sweep ends.

In use, a plurality of the sweeps 11 are typically provided on the tool bar or frames, spaced apart from one another in one or more rows, for creating spaced parallel furrows when passed through the soil. As shown in FIG. 1, in the preferred embodiment, the sweeps are arrayed in staggered rows, with the sweeps of the trailing row offset from the sweeps of the first row. The spacing between the sweeps is not critical. Optimal spacing may be readily determined by the skilled practitioner, and may vary with the number of rows, sweep dimension, and soil type and conditions. Without being limited thereto, in single row systems the lateral spacing between the adjacent ends of the sweeps will typically be about 10 to 20 inches. In staggered, two row systems as shown in FIG. 1, the lateral spacing between the ends of adjacent sweeps will typically be the width of the trailing sweep. It is understood that in such multi-row sweep arrangements, the positioning of the tillers 20 should be determined relative to the path of travel of the ends 15 of the sweeps in the lead or forward row for optimal energy savings.

The apparatus is preferably constructed as a field-going machine including a ground traversing carriage 30 (FIG. 2) which is attached to the frame or frames 10 carrying the above-mentioned sweeps 11, tillers 20, and any other optional implements as well as means for providing power (not shown) to drive the components. The carriage may include a hitch for attaching the apparatus to any suitable field traversing machine such as a tractor. Movement of the apparatus between a raised position for transportation and storage and a lowered position for engaging the ground may be accomplished by a conventional lifting device (not shown) such as pneumatic or hydraulic cylinders. Power to operate the components may include a suitable power take-off mechanism for connection to the tractor or vehicle as is conventional in the art, or a self-contained power source such as a diesel or gasoline engine, or electric engines drawing energy from the vehicle. In the alternative, the apparatus may be constructed as part of a self-propelled machine having its own power source or engine. In either embodiment, the skilled practitioner will recognize that the power supply should include suitable drive belts, gears, or other conventional drive mechanisms for connection between the power source and the moving components.

The apparatus may optionally include other implements, including but not limited to additional tillage devices such as plows or shovels, or mowers which may be attached to the same or a different frame. For instance, in a preferred embodiment, the sweeps 11 may be provided with cultivator shovels or chisel plow blades as are conventional in the art. As shown in FIG. 2, a chisel plow blade 40 may be incorporated into the sweep adjacent to the apex 14 of the blades, or it may be attached to the chisel shank 12 and extend in front of the sweep apex 14.

The invention described herein provides an improvement over existing tillage systems incorporating subsurface sweeps. As such, the device may be constructed as a single commercial unit with the tillers 20 and sweeps 11 combined. Alternatively, either sweeps 11 or tillers 20 or both may be provided as a separate units which may be combined with or "retrofitted" to existing systems which lack these implements, or to replace or supplement conventional implements.

During operation, the frame 10 is lowered from its transportation position such that the sweeps 11 and tillers 20 contact and penetrate the ground to the desired depth as the apparatus is moved or pulled across the field. As the tillers pass through the soil ahead of the ends of the sweeps, the soil immediately in line with the path of the ends is disturbed before it is contacted by the blades of the sweep.

The following examples are intended only to further illustrate the invention and are not intended to limit the scope of the subject matter which is defined by the claims.

EXAMPLE 1

The apparatus of the invention was evaluated in both Norfolk sandy Loam and Decatur Clay Loam soils. Initial evaluations were conducted in soil bins at the USDA-ARS National Soil Dynamics Laboratory (NSDL). In these trials, each soil type was prepared to a reasonably high soil strength level, and the soil conditions are shown in Table 1.

Five treatments were developed to test various combinations of sweep and coulter placements. In each treatment, two leading sweeps and a trailing sweep were placed such that each wingtip of the trailing sweep followed a wingtip of a leading sweep. The sweeps were 36.5 cm wide and the trailing sweep was approximately 75 cm behind the leading ones. The coulters were commercially available scalloped coulters 45.7 cm in diameter and always ran at the depth of the sweeps unless stated otherwise.

A system was also developed which allowed the measurement of draft and vertical forces on each individual element of the system. A 2-dimensional extended ring dynamometer was adapted for use with each coulter and each sweep to measure horizontal and vertical forces on each element. Each dynamometer was attached to a framework that provided for positioning each coulter and each sweep relative to one another both laterally and in the direction of travel. Up to three coulters and three sweeps could be used with the system. The entire framework was then attached to a vehicle capable of being operated in the soil bins at the NSDL.

Figure 3:
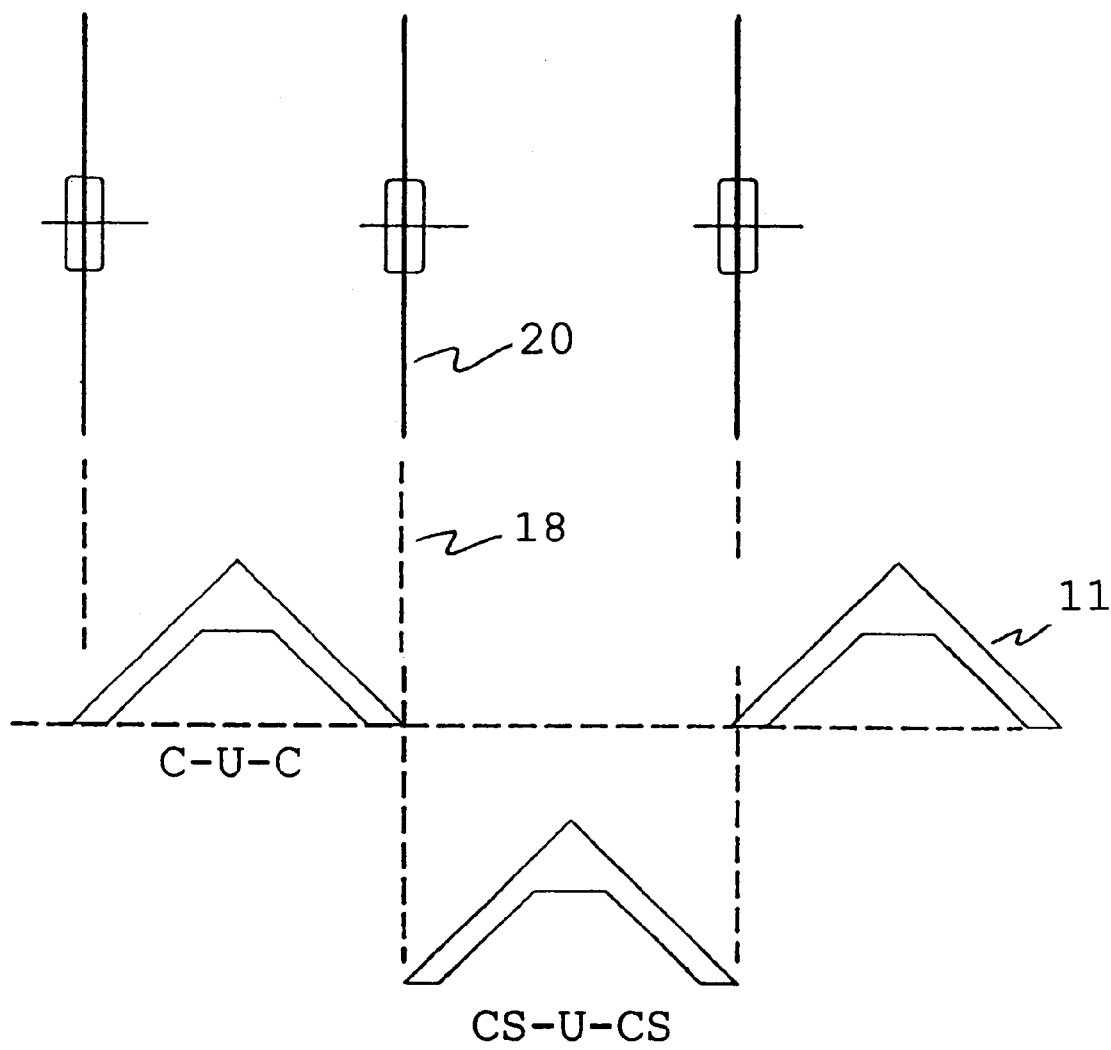
FIG. 3 shows the sweep-coulter systems used in Example 1.
Figure 4:
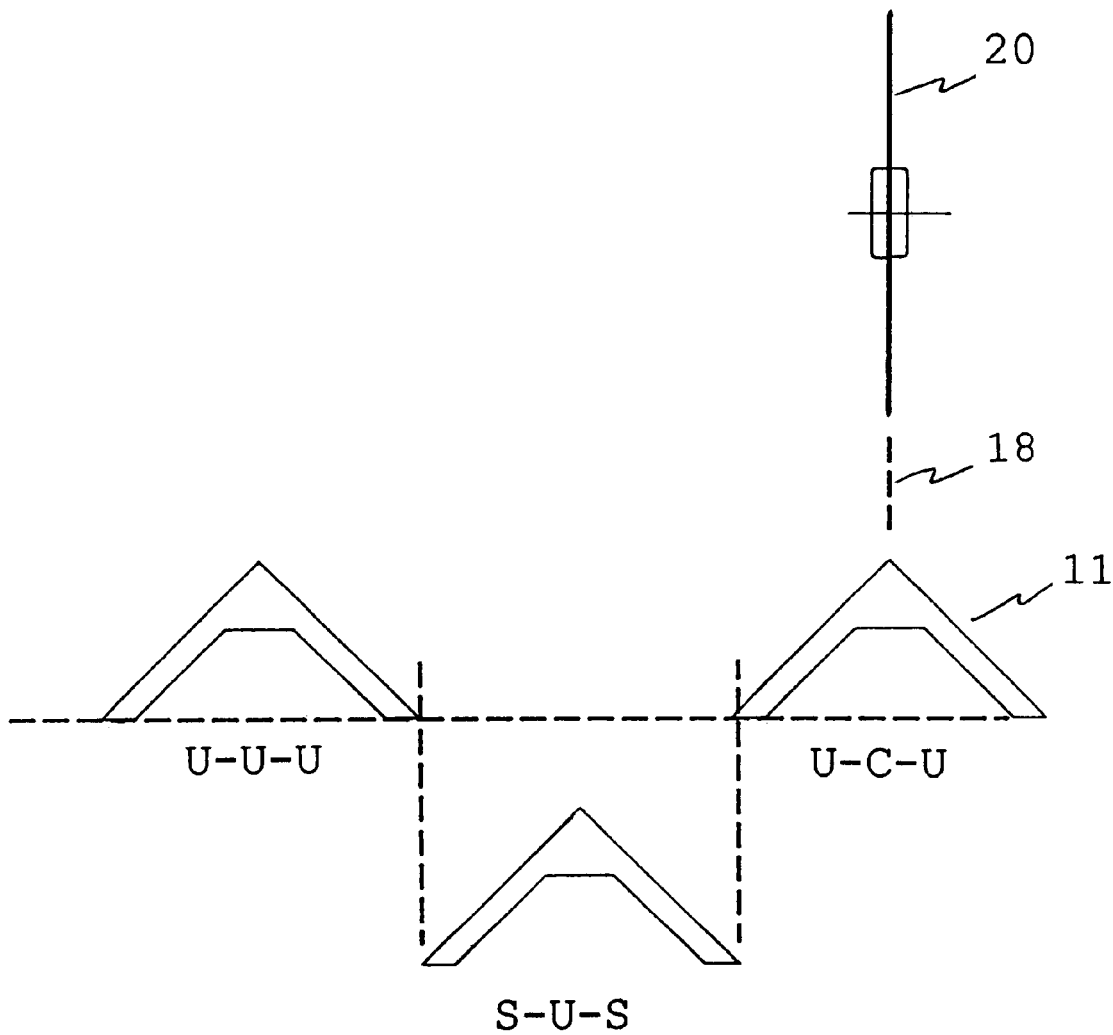
FIG. 4 shows further sweep-coulter systems used in Example 1.

The five treatments required two different sweep-coulter arrangements in the framework, and are shown in FIGS. 3 and 4. The first arrangement, shown in FIG. 3, contained two treatments, while the second arrangement, shown in FIG. 4, contained three treatments. These treatments, each represented by a different treatment code, are summarized in Table 2.

Referring to FIG. 3, treatment code C-U-C placed coulters in front of each wingtip of a leading sweep (i.e. directly ahead of and in line with the wingtips). The inside coulter was in common with one wingtip of the trailing sweep. A second treatment, designated code CS-U-CS, was created by positioning a third sweep's wingtips in line with the other wingtips of the two leading sweeps. The second leading sweep was only used indirectly in this sweep-coulter arrangement.

The second sweep-coulter arrangement is shown in FIG. 4 and contained treatments 3–5. The third treatment, designated code U-U-U, had no coulters ahead of the leading sweep. In the fourth treatment, designated code U-C-U, the second leading sweep had a coulter at its centerline only. For the fifth treatment designated code S-U-S, the remaining trailing sweep operated behind only the wingtips of the leading sweeps.

All results represented herein from the evaluations of the five treatments conducted at the NSDL soil bins are means of four replications. Forward velocity during each run was approximately 3.6 km/hr.

A field study was subsequently conducted in Norfolk Sandy Loam soil at the Alabama Agricultural Experiment Station, E.V. Smith Research Center, near Shorter, Ala., to evaluate the sweep-coulter systems under field conditions. This phase of the study was conducted in extremely heavy residue cover in an area planted the previous year in Sorghum-Sudan grass. This grass, which grew to a height of approximately 2 meters, had not been mechanically disturbed. Most of the grass had fallen and formed a tangled mat on the soil surface. Measurement of percent residue cover on the soil, average length of each residue element, and the mass of residue per square meter of soil surface were recorded at each test site. Characteristics of this residue and the Norfolk Sandy Loam soil are presented in Table 3.

Two separate sweep coulter configurations were simultaneously operated in the heavy residue. One configuration corresponded to treatment code C-U-C in Table 2, and had coulters operating in front of and at the wingtip position of the sweep. In the second configuration, the second sweep was positioned with 35.6 cm between the sweep wingtips, and had a single coulter operating in front of and at the sweep centerline (code U-C-U). Draft and vertical forces were determined independently for each coulter and each sweep. In addition, a video camera was mounted to the implement so that the field of view included the passage of each system through the heavy residue condition. Observations of residue buildup on the sweep shanks were made from the video recordings.

Soil Bin Results

Figure 5:
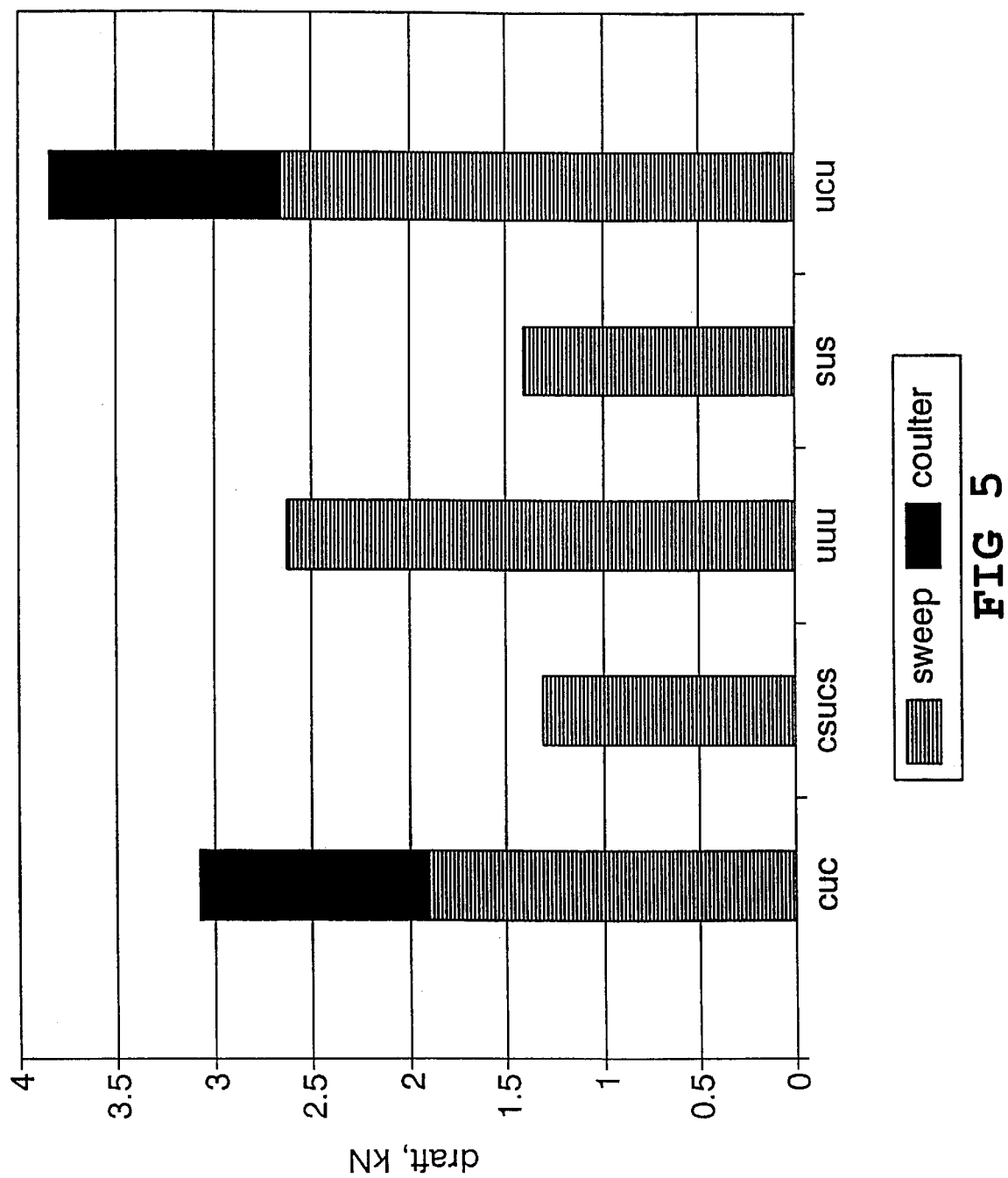
FIG. 5 shows the draft for each leading and trailing sweep wingtip condition used on Norfolk Sandy Loam soil in the National Soil Dynamics Laboratory (NSDL) soil bin. Treatment codes are shown in Table 2.

FIG. 5 shows the results of the sweep and coulter comparisons on Norfolk Sandy Loam Soil, fitting 1. Sweep width was 35.6 cm and the operating depth was 10.2 cm. Minimum draft force in undisturbed soil occurred when a sweep was operated with no coulter, condition U-U-U in Table 2. However, under most conservation farming conditions, coulters are required to prevent plugging of the instrument with residue. Minimum draft force when a coulter is used on a leading sweep occurs when coulters are operated at the wingtips of the sweep, condition C-U-C in Table 2. Operating coulters in front of a sweep at the wingtips (i.e. directly ahead of or in line with the wingtips) and at the same depth as the sweep (10.2 cm) resulted in a 20% reduction in total draft of a sweep plus a single coulter when compared to a sweep plus coulter operating at 10.2 cm depth at the sweep centerline. It is recognized that one additional coulter is needed across the entire implement width to facilitate using a coulter a each wingtip. In this soil type and condition, the savings in draft from operating the coulters at the sweep wingtips would balance the draft of an extra coulter if the implement was only two sweeps in width. Any implement over two sweeps in width would result in a net savings in draft and, therefore, in energy since each of these evaluations were run at almost the same forward velocity.

Also shown in FIG. 5 is the comparison of sweep wingtips operating in soil disturbed by other sweeps (S-U-S) or by sweeps and coulters (C-S-U-C-S). This comparison suggests that disturbed soil at the wingtips is the important contributor, and the method of obtaining this disturbed soil seems insignificant.

Figure 6:
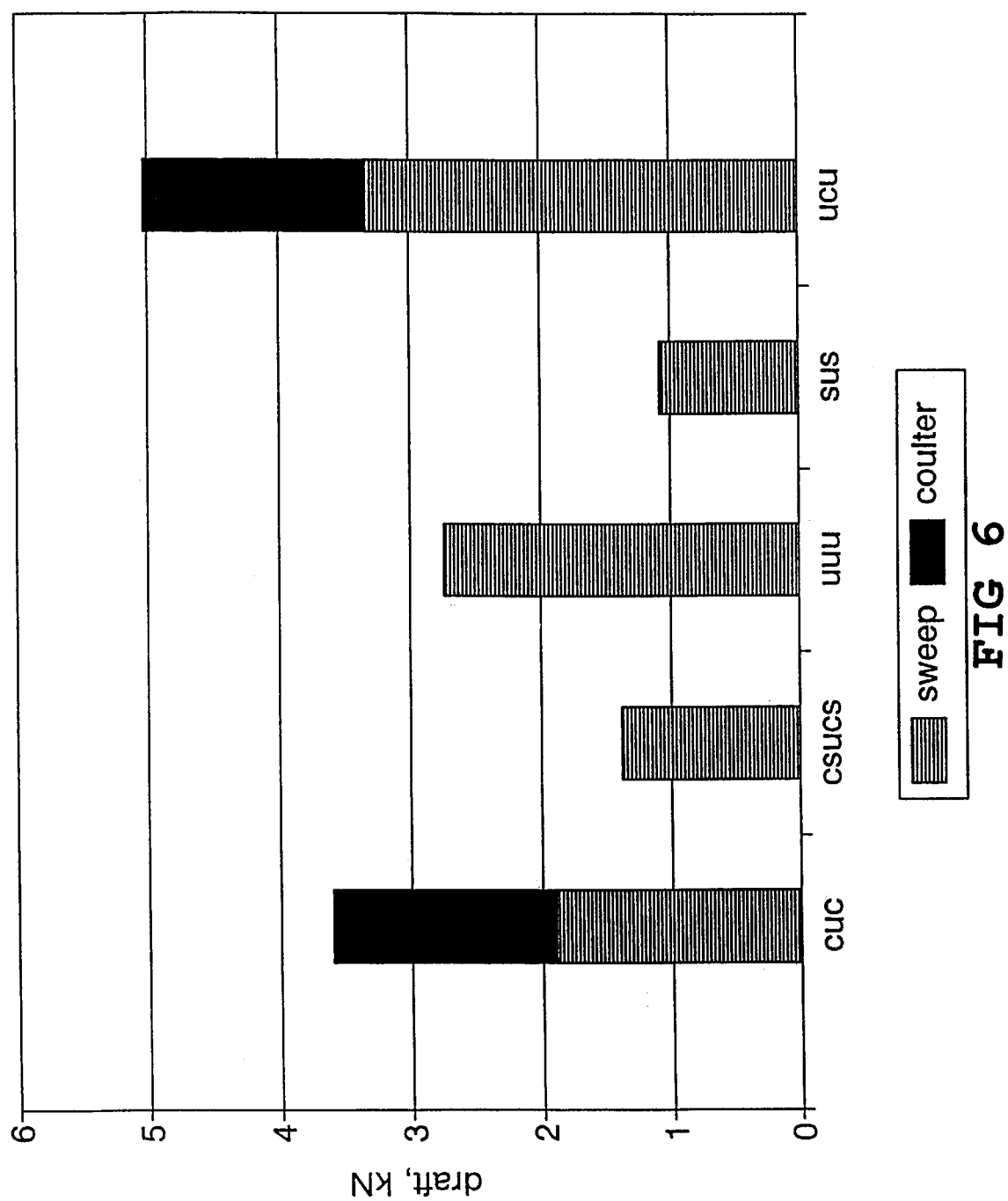
FIG. 6 shows the draft for each leading and trailing sweep wingtip condition used on Decatur Clay Loam soil in the NSDL soil bin. Treatment codes are shown in Table 2.

FIG. 6 presents data similar to FIG. 5 except that it was conducted on Decatur Clay Loam Soil, fitting 1. In this soil type and condition, operating coulters at the sweep wingtips at the same depth as the sweep on leading sweeps (C-U-C) reduced the draft by 28%, as compared to operating a coulter at the sweep centerline (U-C-U). Considering the extra coulter required for the wingtip coulter system, any implement over two sweeps in width would result in a net savings in draft and, therefore, in energy.

FIG. 6 also shows the comparison of a sweep operating in fully undisturbed soil (U-U-U) compared to the sweep only of the sweep-center coulter combination (sweep portion only of U-C-U). For this soil type and condition, the operation of the coulter at the sweep centerline caused a 21% increase in the draft on the sweep.

When the trailing sweep wingtips were operating following sweeps plus coulters (treatment CS-U-CS) the operation of the coulter resulted in a slight increase in draft when compared to treatment S-U-S, as indicated in FIG. 6. Also when the draft for the sweep portion of the treatment C-U-C is compared to the draft from treatment S-U-S, the results indicate that the coulter is not as effective as another sweep in providing loose soil at the sweep wingtips. However, the coulter does provide significant wingtip relief and facilitates passage through the residue.

Figure 7:
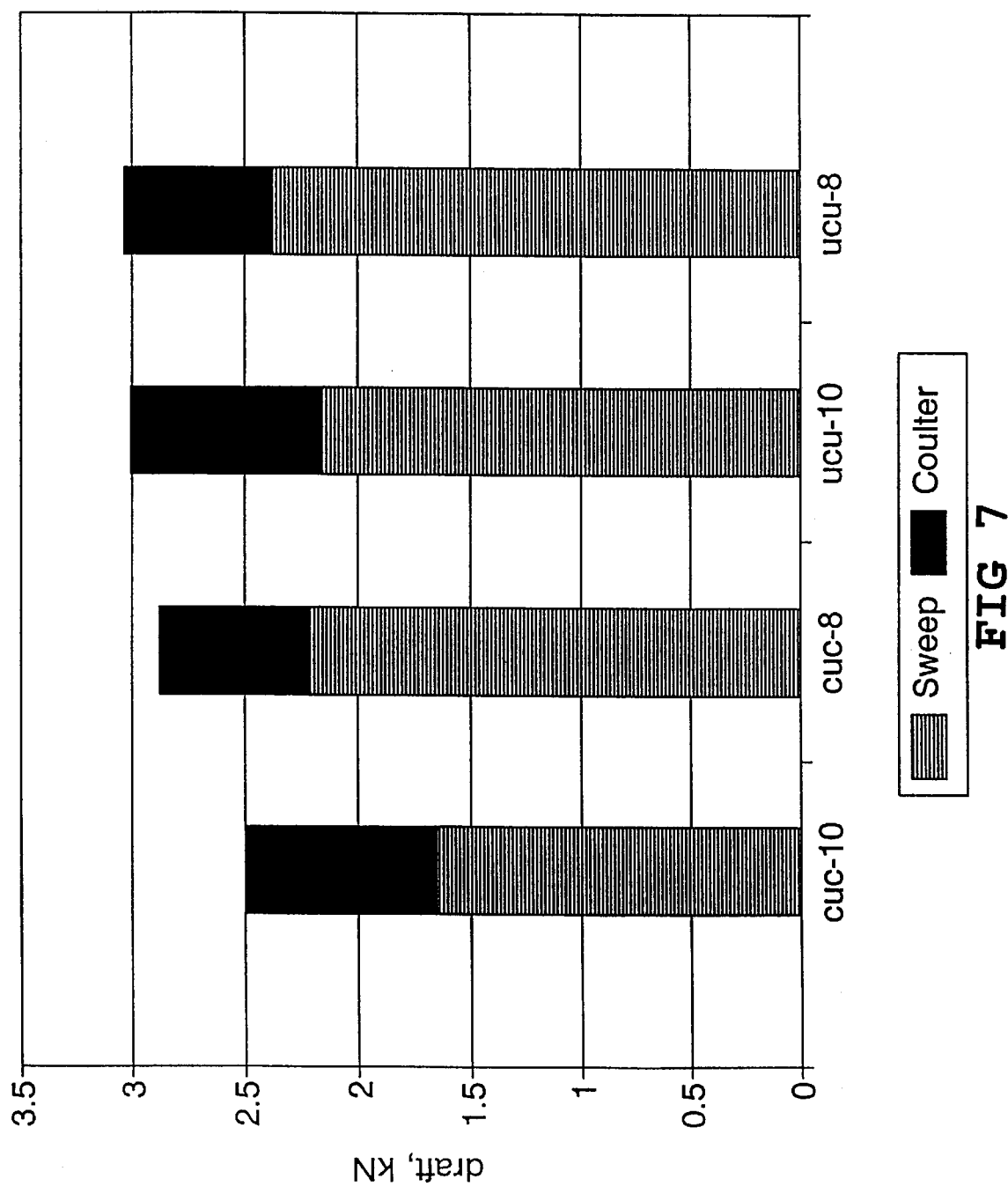
FIG. 7 shows the effect of the lead sweep wingtip coulter depth on Norfolk Sandy Loam soil in the NSDL soil bin. The number following the treatment code is the depth of the coulter in cm.
Figure 8:
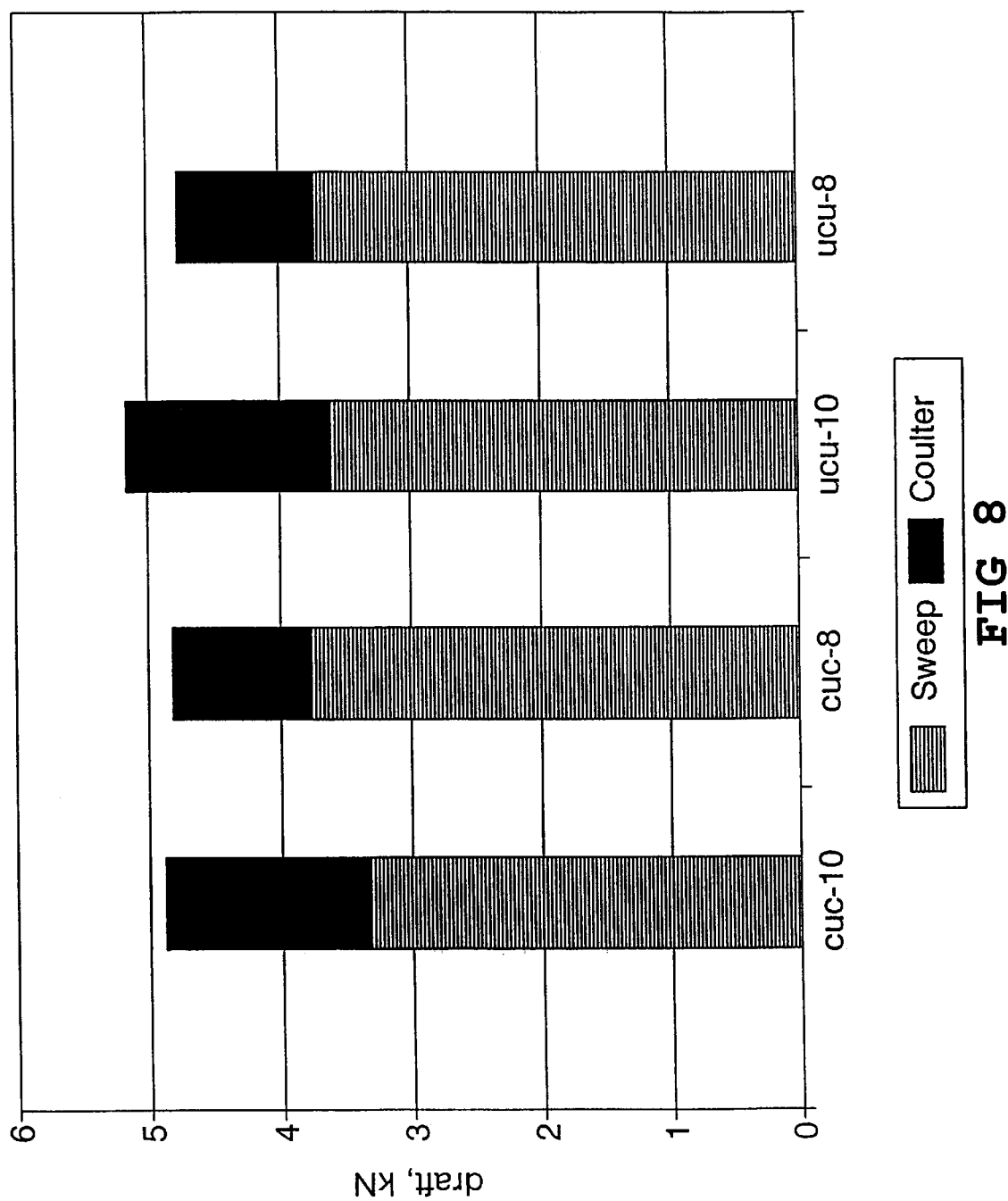
FIG. 8 shows the effect of lead sweep wingtip coulter depth on Decatur Clay Loam soil in the NSDL soil bin. The number following the treatment code is the depth of the coulter in cm.

FIGS. 7 and 8 show the effect of coulter depth on the draft of the lead sweep-coulter system, when operated in Norfolk Sandy Loam soil, fitting 2, and Decatur Clay Loam Soil, fitting 2, respectively. The sweeps were consistently operated at 10.2 cm depth. Coulters were operated at 10.2 cm or 7.6 cm. Results on Norfolk soil show a decrease in coulter-sweep draft for the C-U-C treatment with the coulter operating at 10.2 cm depth when compared to the 7.6 cm depth. When the coulter was operating in the Norfolk soil at the sweep center, there was no appreciable difference in total draft for the two depths. Results on the Decatur soil (FIG. 8) show no consistent trends for the total draft of sweeps plus coulters. It appears that, in this soil, reducing the depth of the coulter causes a slight increase in sweep draft but the reduction in coulter draft makes the total of coulter plus sweep draft about equal for the two depths.

Field Results

Figure 9:
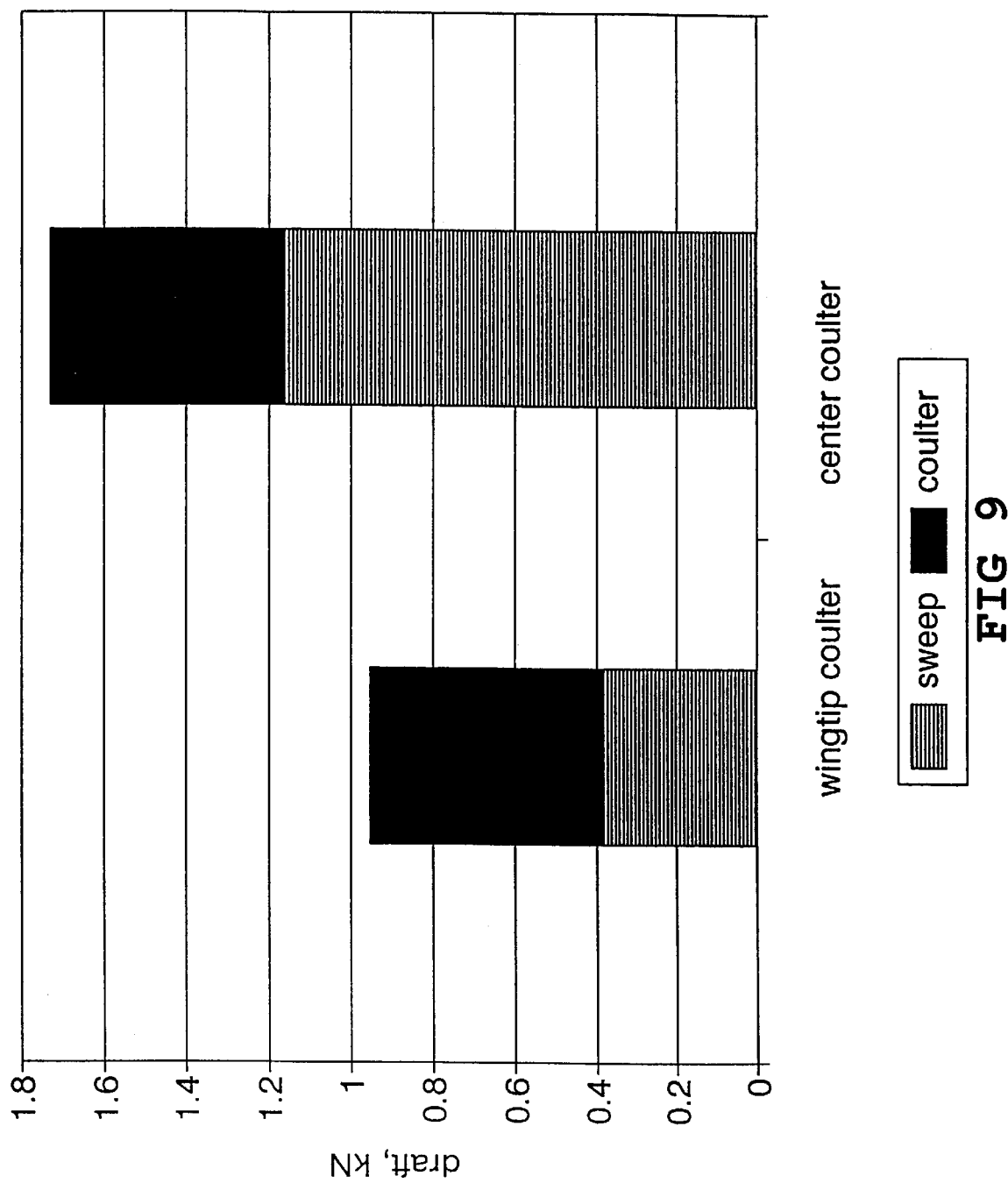
FIG. 9 shows the effects of the lead sweep wingtip and lead sweep center coulters on draft of sweep coulter combinations in Norfolk Sandy Loam soil. Tests were conducted under field conditions in heavy residue at 3.5 km/hr velocity.

FIG. 9 shows the results of eight replications from the heavy residue field experiment in Norfolk Sandy Loam soil. Four replications were conducted with the machine operating in one direction and four replications in the opposite direction to account for residue lodging direction effects. Since there was no apparent difference in draft or residue flow, the results were pooled. The coulters and sweeps were operated at the same 10.2 cm depth and at a forward velocity of 3.5 km/hr. Results show a 45% reduction in total draft for the lead sweep-coulter system with leading coulters mounted at the sweep wingtips, as compared to the draft of a sweep plus coulter system with the coulter operating at the sweep center. The requirement for one extra coulter for the entire machine for the wingtip coulter system would only slightly affect this draft reduction. The wingtip coulter system performed without clogging in the heavy residue condition, although there was a tendency for the soil and residue to rise on the sweep shank to a greater height than the center coulter system, as shown in Table 4.

Figure 10:
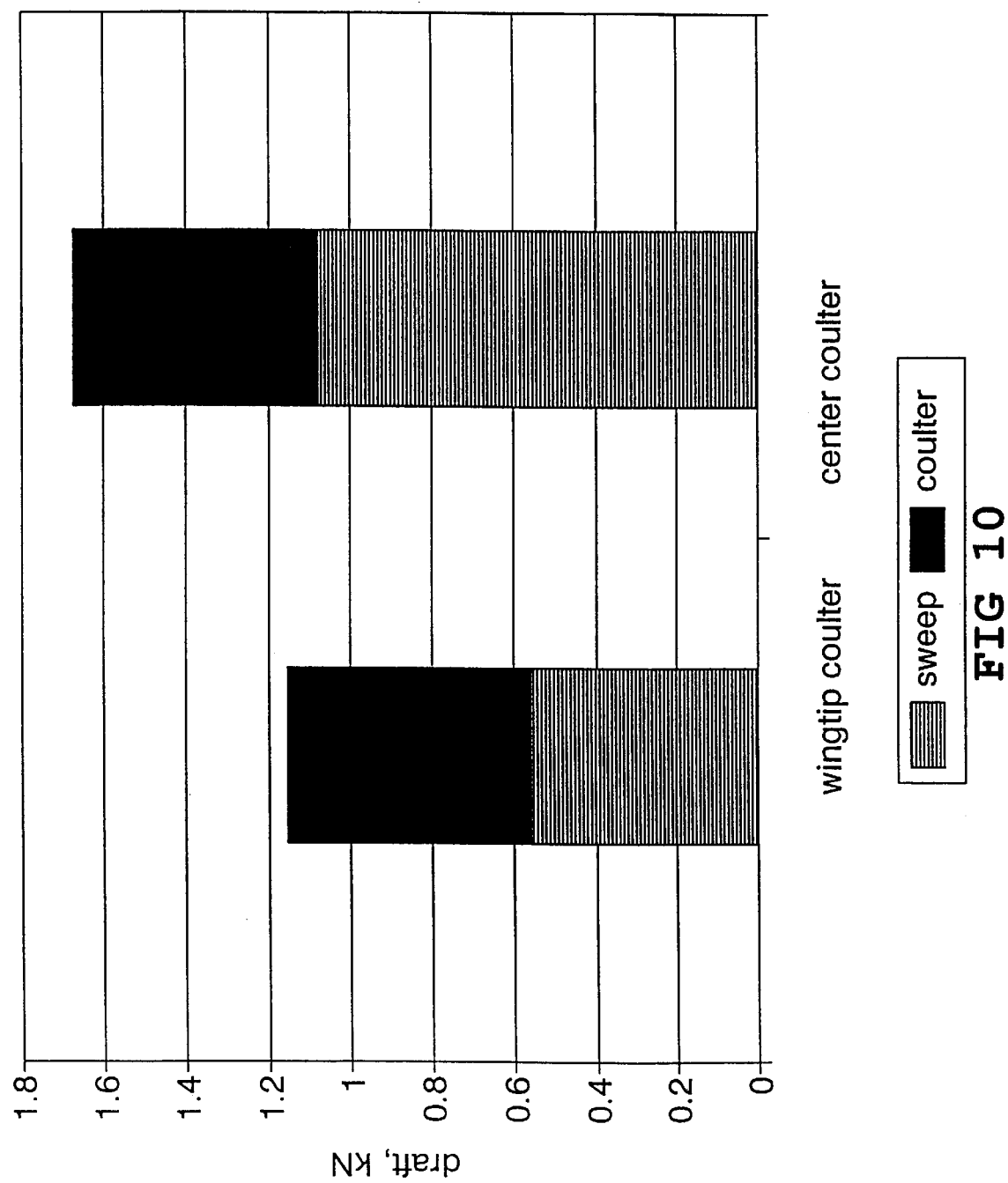
FIG. 10 shows the effects of the lead sweep wingtip and lead sweep center coulters on draft of sweep coulter combinations in Norfolk Sandy Loam soil. Tests were conducted under field conditions in heavy residue at 4.8 km/hr velocity.

FIG. 10 shows the results of a similar evaluation to FIG. 9 but at a forward velocity of 4.8 km/hr. Results in FIG. 10 are means of 8 replications that were run at 10.2 cm depth within the same field as the 3.5 km/hr tests. Results show a 31% reduction in draft for the lead sweep-coulter system with the leading coulters operating at the sweep wingtips as compared to the draft of a sweep plus coulter system with the coulter operating at the sweep center. The center coulter system had almost the same draft at the two different velocities. The system with the coulters operating at the sweep wingtips had a slight increase in draft at the higher velocity. This increase in draft may be partially explained by the height of soil on the sweep shank at the higher velocity for the sweep wingtip coulter system, as shown in Table 4.

It is understood that the foregoing detailed description is given merely by way of illustration and that modifications and variations may be made therein without departing from the spirit and scope of the invention.

TABLE 1

Soil Characteristics of NSDL Soil Bin Study

| Soil Type-Fitting | Mean | | Standard Deviation | |
|---|---|---|---|---|
| | Dry Bulk Density ($Mg/m^3$) | Moisture Content % | Dry Bulk Density ($Mg/m^2$) | Moisture Content % |
| Norfolk-1 | 1.88 | 9.5 | 0.035 | 0.23 |
| Norfolk-2 | 1.86 | 9.1 | 0.043 | 0.48 |
| Decatur-1 | 1.55 | 12.7 | 0.084 | 0.37 |
| Decatur-2 | 1.55 | 13.4 | 0.063 | 0.37 |

TABLE 2

Treatment type and code for each sweep-coulter comparison

| CODE | TREATMENT TYPE |
|---|---|
| Leading Sweeps: | |
| C-U-C | Coulter pass at each lead sweep wingtip, no center coulter |
| U-U-U | Undisturbed soil at each lead sweep wingtip, no center coulter |
| U-C-U | Undisturbed soil at each lead sweep wingtip, coulter at sweep center |
| Trailing Sweeps: | |
| S-U-S | Lead sweep operated at each wingtip, no center coulter |
| CS-U-CS | Coulter and lead sweep at each wingtip, no center coulter |

Where:
C = coulter
S = sweep
U = undisturbed

TABLE 3

Residue and Soil Characteristics-Field Study

| | Residue Length, (cm) | Residue Mass$_1$, ($kg/m^2$) | Cover (%) | Soil Bulk Density$_1$ ($Mg/m^3$) | Soil Moisture Content (%) |
|---|---|---|---|---|---|
| Mean | 39.2 | 0.94 | 98.2 | 1.8 | 9.4 |
| Std. Dev. | 30.5 | 0.17 | 0.7 | 0.07 | 0.7 |

Mean Cone Index over soil depth range 0 to 102 cm = .424 MPa
Maximum Cone Index over soil depth range 0 to 102 cm = 1.5 MPa
$_1$dry basis

TABLE 4

Height of Soil and Residue on Sweep Shanks for the Sweep-Coulter Systems

| | Wingtip Coulter System, Mean | | Center Coulter System, Mean | |
|---|---|---|---|---|
| Forward Velocity (km/h) | Soil Height (cm) | Residue Height (cm) | Soil Height (cm) | Residue Height (cm) |
| 3.5 | 12.7 | 18.1 | 12.4 | 7.9 |
| 4.8 | 17.0 | 22.3 | 15.6 | 12.6 |

We claim:

1. An apparatus for tillage of soil comprising:
   a. one or more subtillers comprising a downwardly extending chisel shank with a depending sweep blade at the lower end thereof effective for subtilling when passed through the soil, said sweep blade comprising a pair of joined diverging blades which extend rearwardly and outwardly, terminating at outer ends; and
   b. one or more first tillers positioned forward of said outer ends of said diverging blades and at a lateral proximity to the path of travel of said outer ends, and further wherein said lateral proximity of said first tillers from the path of travel of said outer ends is effective to disturb or loosen the soil in a vertical plane containing said path of travel
wherein said apparatus does not include coulters positioned ahead of the center of said sweep blade, and further wherein said first tiller is selected from the group consisting of coulters, rippers, knives, chisel plow shank, and cultivator shovels.

2. The apparatus of claim 1 wherein said first tillers are positioned substantially in line with or outside of said path of travel of said outer ends of said diverging blades.

3. The apparatus of claim 2 wherein said first tillers are laterally spaced from said path of travel of said outer ends of said diverging blades between about 0 to 2 inches.

4. The apparatus of claim 3 wherein said first tillers are laterally spaced from said path of travel of said outer ends of said diverging blades between about 0 to 1 inches.

5. The apparatus of claim 4 wherein said first tillers are laterally spaced from said path of travel of said outer ends of said diverging blades between about 0.5 to 1 inches.

6. The apparatus of claim 1 wherein said first tillers extend to a depth which is effective to loosen the soil ahead of and substantially at or above the level of said outer ends of said sweeps.

7. The apparatus of claim 6 wherein said first tillers extend to a depth which is at least about 50% of the depth of said outer ends of said sweeps.

8. The apparatus of claim 7 said first tillers extend to approximately the same depth or lower as said outer ends of said sweeps.

9. The apparatus of claim 1 wherein said first tillers are positioned forward of each of the outer ends of said diverging blades.

10. The apparatus of claim 1 further comprising one or more frames, wherein said chisel shank and said first tillers are attached to and depend from the same said frame.

11. The apparatus of claim 1 further comprising more than one frame, wherein said chisel shank and said first tillers are attached to and depend from different said frames.

12. The apparatus of claim 1 wherein said first tiller is a coulter.

13. The apparatus of claim 1 wherein said sweep blade is generally V-shaped and said diverging blades are inclined with the trailing edge thereof being higher than the leading edge.

14. The apparatus of claim 1 wherein said sweep blade is generally V-shaped and said diverging blades are substantially horizontal.

15. The apparatus of claim 1 wherein said chisel shank is connected to said sweep blade at the junction of said diverging blades.

16. The apparatus of claim 15 further comprising a second tiller positioned forward of the junction of said diverging blades which is effective for penetrating the soil and creating furrows when passed through the soil.

17. The apparatus of claim 16 wherein said second tiller is attached to said chisel shank.

18. The apparatus of claim 16 wherein said second tiller comprises a chisel blade attached to said chisel shank.

19. In a method for tillage of soil comprising passing a first tiller through the soil followed by a subtiller below the surface of the soil, said first tiller being selected from the group consisting of coulters, rippers, knives, chisel plow shank, and cultivator shovels, said subtiller comprising a downwardly extending chisel shank with a depending sweep blade at the lower end thereof effective for subtilling when passed through the soil, said sweep blade comprising a pair of joined diverging blades which extend rearwardly and outwardly, terminating at outer ends, wherein the improvement comprises positioning one or more of said first tillers forward of said outer ends of said diverging blades and at a lateral proximity to the path of travel of said outer ends, and further wherein said lateral proximity of said first tillers from the path of travel of said outer ends is effective to disturb or loosen the soil in said path of travel, and further still wherein no coulters are provided ahead of and in the path of travel of the center of said sweep blade.

20. The method of claim 19 wherein said first tillers are positioned substantially in line with or outside of said path of travel of said outer ends of said diverging blades.

21. The method of claim 20 wherein said first tillers are laterally spaced from said path of travel of said outer ends of said diverging blades between about 0 to 2inches.

22. The method of claim 21 wherein said first tillers are laterally spaced from said path of travel of said outer ends of said diverging blades between about 0 to 1 inches.

23. The method of claim 22 wherein said first tillers are laterally spaced from said path of travel of said outer ends of said diverging blades between about 0.5 to 1 inches.

24. The method of claim 19 wherein said first tillers extend to a depth which is effective to loosen the soil ahead of and at the level of said outer ends of said sweeps.

25. The method of claim 24 wherein said first tillers extend to a depth which is at least about 50% of the depth of said outer ends of said sweeps.

26. The method of claim 25 said first tillers extend to approximately the same depth or lower as said outer ends of said sweeps.

27. The method of claim 26 wherein said first tillers are positioned forward of each of the outer ends of said diverging blades.

28. An apparatus for tillage of soil comprising:
   a. one or more subtillers comprising a downwardly extending chisel shank with a depending sweep blade at the lower end thereof effective for subtilling when passed through the soil, said sweep blade comprising a pair of joined diverging blades which extend rearwardly and outwardly, terminating at outer ends; and
   b. one or more coulters positioned forward of said sweep blade, said coulters consisting essentially of coulters positioned forward of said outer ends of said diverging blades and at a lateral proximity to the path of travel of said outer ends, and further wherein said lateral proximity of said coulters from the path of travel of said outer ends is effective to disturb or loosen the soil in a vertical plane containing said path of travel.

29. In a method for tillage of soil comprising passing one or more coulters through the soil followed by one or more subtillers below the surface of the soil, said subtillers comprising a downwardly extending chisel shank with a depending sweep blade at the lower end thereof effective for subtilling when passed through the soil, said sweep blade comprising a pair of joined diverging blades which extend rearwardly and outwardly, terminating at outer ends, wherein the improvement comprises positioning all of said coulters forward of said outer ends of said diverging blades and at a lateral proximity to the path of travel of said outer ends, and further wherein said lateral proximity of said coulters from the path of travel of said outer ends is effective to disturb or loosen the soil in said path of travel.

* * * * *